United States Patent
Linzer

(10) Patent No.: US 8,164,636 B1
(45) Date of Patent: *Apr. 24, 2012

(54) DIGITAL STILL CAMERA WITH MULTIPLE FRAMES COMBINED INTO A SINGLE FRAME FOR DIGITAL ANTI-SHAKE/ANTI-BLUR

(75) Inventor: Elliot N. Linzer, Suffern, NY (US)

(73) Assignee: Ambarella, Inc., Santa Clara, CA (US)

(*) Notice: Subject to any disclaimer, the term of this patent is extended or adjusted under 35 U.S.C. 154(b) by 695 days.

This patent is subject to a terminal disclaimer.

(21) Appl. No.: 12/256,723

(22) Filed: Oct. 23, 2008

Related U.S. Application Data

(63) Continuation of application No. 11/689,008, filed on Mar. 21, 2007.

(51) Int. Cl.
*H04N 5/228* (2006.01)

(52) U.S. Cl. ......... 348/208.12; 348/208.16; 348/333.07; 348/333.12

(58) Field of Classification Search .............. 348/268, 348/416, 208.13, 208.16
See application file for complete search history.

(56) References Cited

U.S. PATENT DOCUMENTS

| | | | |
|---|---|---|---|
| 5,568,196 A * | 10/1996 | Hamada et al. | 348/416.1 |
| 5,754,700 A | 5/1998 | Kuzma | 384/621 |
| 6,100,937 A | 8/2000 | DiMeo | 348/621 |
| 6,304,682 B1 | 10/2001 | Patti | 382/299 |
| 6,381,279 B1 | 4/2002 | Taubman | 375/240.18 |
| 6,697,109 B1 * | 2/2004 | Daly | 348/268 |
| 7,181,072 B2 | 2/2007 | Wang et al. | 382/239 |
| 2003/0123551 A1 | 7/2003 | Kim | 375/240.16 |
| 2003/0133020 A1 | 7/2003 | Suh | 348/218.1 |
| 2003/0202713 A1 | 10/2003 | Sowa | 382/260 |
| 2004/0252759 A1* | 12/2004 | Winder et al. | 375/240.12 |
| 2005/0058344 A1* | 3/2005 | Xu | 382/173 |
| 2005/0078750 A1* | 4/2005 | Shen et al. | 375/240.12 |
| 2005/0138532 A1 | 6/2005 | Park | 714/776 |
| 2005/0259877 A1 | 11/2005 | Wang et al. | 382/236 |
| 2006/0165183 A1* | 7/2006 | Numajiri et al. | 375/240.29 |
| 2006/0290821 A1 | 12/2006 | Soupliotis et al. | 348/701 |
| 2007/0071344 A1 | 3/2007 | Ouzilevski et al. | 382/254 |
| 2008/0060034 A1* | 3/2008 | Egnal et al. | 725/105 |

* cited by examiner

*Primary Examiner* — Djenane Bayard

(74) *Attorney, Agent, or Firm* — Christopher P. Maiorana, PC

(57) ABSTRACT

A method of capturing a still frame is disclosed. The method generally includes the steps of (A) generating a plurality of initial frames with a sensor in response to an optical signal and (B) generating the still frame by combining the initial frames using a noise reduction technique.

19 Claims, 5 Drawing Sheets

DIGITAL STILL CAMERA WITH MULTIPLE FRAMES COMBINED INTO A SINGLE FRAME FOR DIGITAL ANTI-SHAKE/ANTI-BLUR

This is a continuation of U.S. Ser. No. 11/689,008, filed Mar. 21, 2007, which is incorporated by reference.

FIELD OF THE INVENTION

The present invention relates to a method and/or architecture for digital cameras generally and, more particularly, to a digital still camera with multiple frames combined into a single frame for digital anti-shake/anti-blur.

BACKGROUND OF THE INVENTION

When taking pictures in low-light conditions, a conventional camera can employ some or all of an increased shutter time, a high gain and an increased aperture to make the picture brighter. Increasing the shutter time directly increases the amount of light in an exposure. However, the resulting picture will blur if the camera or the subject moves during the exposure. A high gain (i.e., a high International Standards Organization (ISO) number) amplifies the picture signal after having been received by a sensor. Unfortunately, the high gain can increase the amount of noise in the picture. An increased aperture (i.e., reduce f-stop number) directly increases the amount of light in the exposure. Lenses have a maximum aperture (smallest f-stop number) and so the aperture can only be increased so far.

Two types of conventional anti-shake (sometimes called anti-blur) technologies are currently available, mechanical anti-shake and digital anti-shake/anti-blur based on an increased ISO number. The mechanical anti-shake technology moves the lens or sensor while the shutter is open to counteract camera motion. The digital anti-shake/anti-blur technology increases the ISO number while the shutter time is correspondingly reduced. Mechanical anti-shake gives much better image quality as the shutter can remain open longer, which also reduces noise. However, the mechanical anti-shake implementations use additional physical components adding to the overall expensive. It is desirable to have a technique that can achieve a better tradeoff between motion blur and image noise than the conventional techniques listed above.

SUMMARY OF THE INVENTION

The present invention concerns a method of capturing a still frame. The method generally comprises the steps of (A) generating a plurality of initial frames with a sensor in response to an optical signal and (B) generating the still frame by combining the initial frames using a noise reduction technique.

The objects, features and advantages of the present invention include providing a digital still camera with multiple frames combined into a single frame for digital anti-shake/anti-blur that may (i) reduce shaking, (ii) reduce blurring, (iii) lower image noise compared with conventional techniques, (iv) average multiple images into a single, clearer image and/or (v) be implemented at a lower cost than conventional designs.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
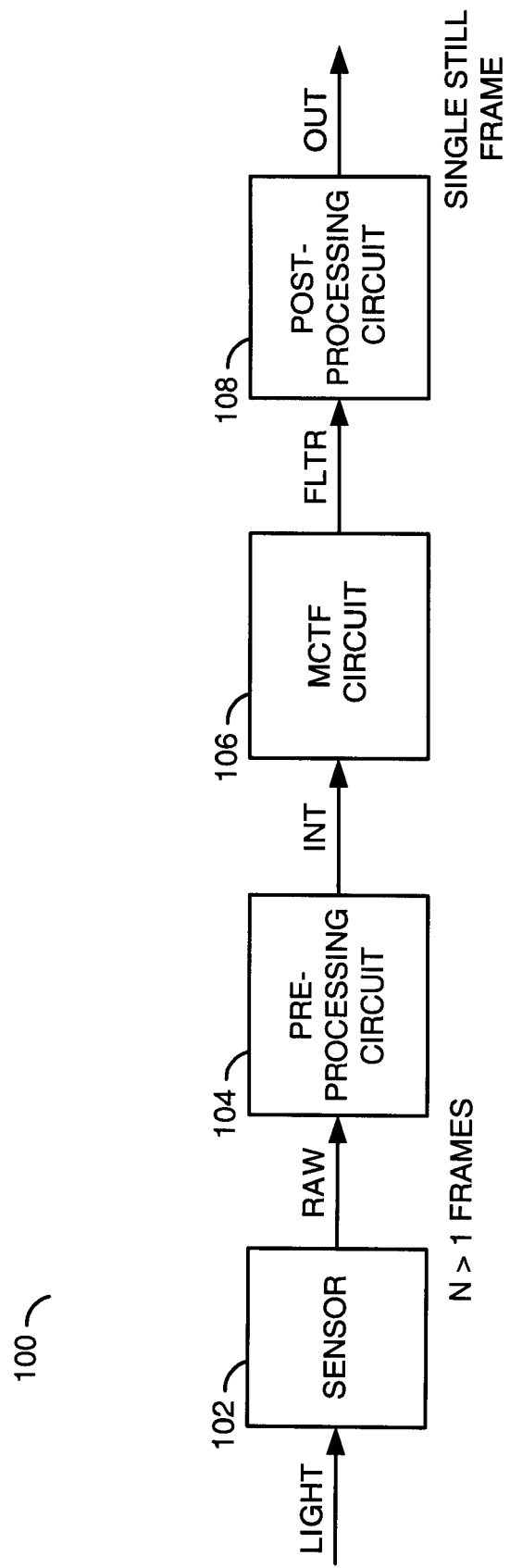
FIG. 1 is a block diagram of an example implementation of a device in accordance with a preferred embodiment of the present invention.

Referring to FIG. 1, a block diagram of an example implementation of a device 100 is shown in accordance with a preferred embodiment of the present invention. The device (or system) 100 may implement a motion compensated temporal filtering (MCTF) camera having a digital anti-shake capability. The device 100 is generally operational to capture a sequence of still frames then motion compensated temporal filter the still frames to generate a final frame. Capturing of the individual still frames may be performed at a high ISO number (gain), with short shutter times and over a short period. The temporal filtering generally reduces the overall image noise in the final frame.

The device 100 generally comprises a circuit (or module) 102, a circuit (or module) 104 and a circuit (or module) 106 and a circuit (or module) 108. An optical signal (e.g., LIGHT) may be received by the circuit 102. The circuit 102 may generate and present a signal (e.g., RAW) to the circuit 104. An intermediate signal (e.g., INT) may be generated by the circuit 104 and presented to the circuit 106. The circuit 106 may generate and present a filtered signal (e.g., FLTR) to the circuit 108. The circuit 108 may present an output signal (e.g., OUT).

The circuit 102 may be implemented as an electro-optical sensor. The circuit 102 generally comprises an array of pixels (e.g., 8 million pixels) that are operational to convert the optical signal LIGHT into the electrical signal RAW. The signal RAW may comprise a digital signal containing a raw digital value for each of the pixels of the circuit 102 arranged in a sequence of frames. The raw digital values may be proportional to the intensity of light striking the respective pixels. A rapid sequence of frames (e.g., 2 to 16) may be presented in a burst for each received user command to take a picture (or frame).

The circuit 104 may implement a pre-processing circuit. The circuit 104 may be operational to process the signal RAW to present the signal INT. Processing of the signal RAW may include, but is not limited to, digital gain for color corrections, digital offsets for color corrections, spatial scaling and color space conversion.

The circuit 106 may implement an MCTF circuit. The circuit 106 is generally operational to temporally combine the multiple frames received in the burst into a final frame. While combining, the circuit 106 may also be operational to motion compensate the frames into spatial alignment with each other. The motion compensation may be performed on individual blocks (e.g., 16×16, 16×8, 8×16, 8×8, 8×4, 4×8 or 4×4 pixel blocks) with each of the frames to account for motion in the scene and motion of the camera.

The circuit 108 may be implemented as a post-processing circuit. The circuit 108 is generally operational to adjust the final frame in the signal FLTR. The adjustments may include, but are not limited to, down converting (e.g., decimation), up converting (e.g., interpolation), filtering, image sharpening, offset adjustments for black-level calibrations, color space conversions and/or image smoothing. Other post-correction functions may be implemented to meet the criteria of a particular application. The signal OUT generally comprises a still frame in a standard format (e.g., JPEG) suitable for display, storage and/or transmission.

Figure 2:
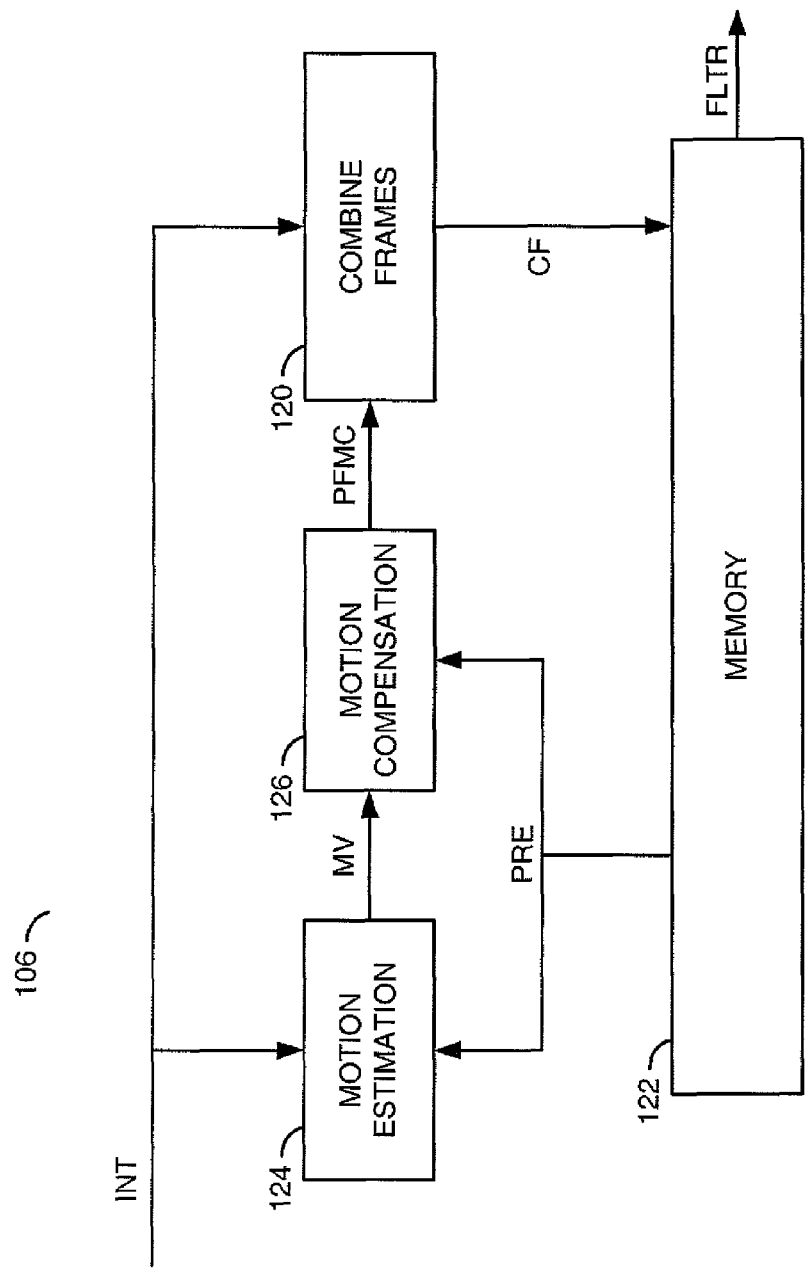
FIG. 2 is a block diagram of a first example implementation of a filter circuit of the device.

Referring to FIG. 2, a block diagram of a first example implementation of the circuit 106 is shown. The circuit 106 generally comprises a circuit (or module) 120, a circuit (or module) 122, a circuit (or module) 124 and a circuit (or module) 126. The signal INT may be received by the circuit 120 and the circuit 124. A signal (e.g., CF) may be generated and presented from the circuit 120 to the circuit 122. The circuit 122 may present a signal (e.g., PRE) to the circuits 124 and 126 and present the signal FLTR to the circuit 108 (see FIG. 1). A signal (e.g., MV) may be generated by the circuit 124 and presented to the circuit 126. The circuit 126 may generate and present a signal (e.g., PFMC) back to the circuit 120.

The circuit 120 may implement a combine circuit. The circuit 120 is generally operational to spatially combine a current frame received in the signal INT with a previous filtered and motion compensated frame received in the signal PFMC to generate a currently filtered frame in the signal CF. Combining of the frames may be performed by one or more techniques described in detail below.

The circuit 122 may implement a memory circuit. The circuit 122 may store the previously filtered frames, the currently filtered frames and the final frame. The previously filtered frames may be read out to the circuit 126 via the signal PRE. The currently filtered frames may be written into the circuit 122 via the signal CF. The final frame may be read from the circuit 122 in the signal FLTR.

The circuit 124 may implement a motion estimation circuit. The circuit 124 is generally operational to generate multiple motion vectors (or values) in the signal MV, at least one motion vector for each block among multiple blocks that make up the previously filtered frame. The motion estimation operation may be performed using existing techniques with the current frame in the signal INT acting as a reference frame. As such, the previous frame may be subsequently compensation to spatially align with the current frame.

The circuit 126 may implement a motion compensation circuit. The circuit 126 may be operational to motion compensate the blocks of the previous frame received in the signal PRE based on the motion information received in the signal MV. The motion compensation function is generally preformed multiple times per frame, once for each individual block within the previous frame. Each block generally has a respective motion vector that may be similar to or different from the other motion vectors corresponding to the neighboring blocks.

One or more methods may be implemented to combine multiple frames into one still frame. In a first method, the frame may be processed and combined in a temporal order. In a second method, the frames may be temporally shifted to a central time. In a third method, the frames may be combined using a "pyramid" style combination. Other methods may be implemented to meet the criteria of a particular application.

Figure 3:
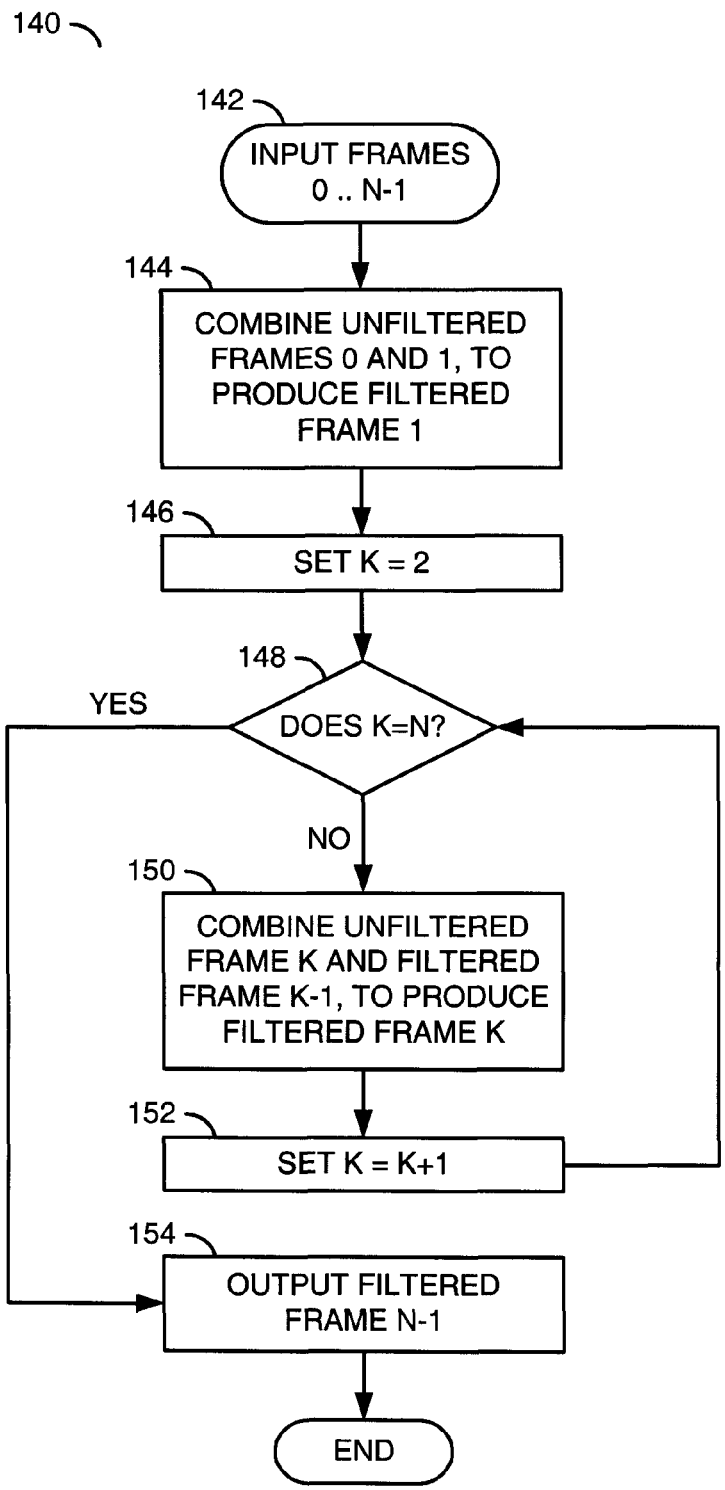
FIG. 3 is a flow diagram of an example method of filtering, compensating and combining.

Referring to FIG. 3, a flow diagram of an example method 140 of filtering, compensating and combining is shown. The method (or process) 140 may implement the first anti-shake/anti-blur method (or technique). The method 140 generally combines each subsequent frame in a series of frames with an accumulation of the previous frames in the series. The method 140 generally comprises a step (or block) 142, a step (or block) 144, a step (or block) 146, a step (or block) 148, a step (or block) 150 and a step (or block) 152. The method 140 may be implemented by the circuit 106.

A sequence of N frames (e.g., numbered consecutively 0 through N–1) may be received by the circuit 106 in the step 142. The number N generally ranges from 2 to 8, and in some cases up to 16. In the step 144, the circuit 120 may combine the first two frames (e.g., frame 0 and frame 1) to create a filtered frame. A counter (e.g., K) may be set to two in the step 146.

The counter K may be checked against the total number N of frames to be combined in the step 148. If the counter K has not exceeded the last frame (e.g., the NO branch of step 148), the method 140 may continue with the step 150. The circuit 120, the circuit 124 and the circuit 126 may act to combine the current frame (e.g., frame 2) with the previously filtered frame (e.g., the combination of frame 0+frame 1) in the step 150 and store a next filtered frame in the circuit 122.

After processing the current frame, the counter K may be incremented in the step 152 and the method 140 returns to step 148 to check for the last frame in the sequence. Motion compensation and combining generally continue until the last frame in the burst has been added to create the final frame. Once the last frame has been accounted for (e.g., the YES) branch of step 148, the final frame may be available to read out of the circuit 122 in the step 154.

Figure 4:
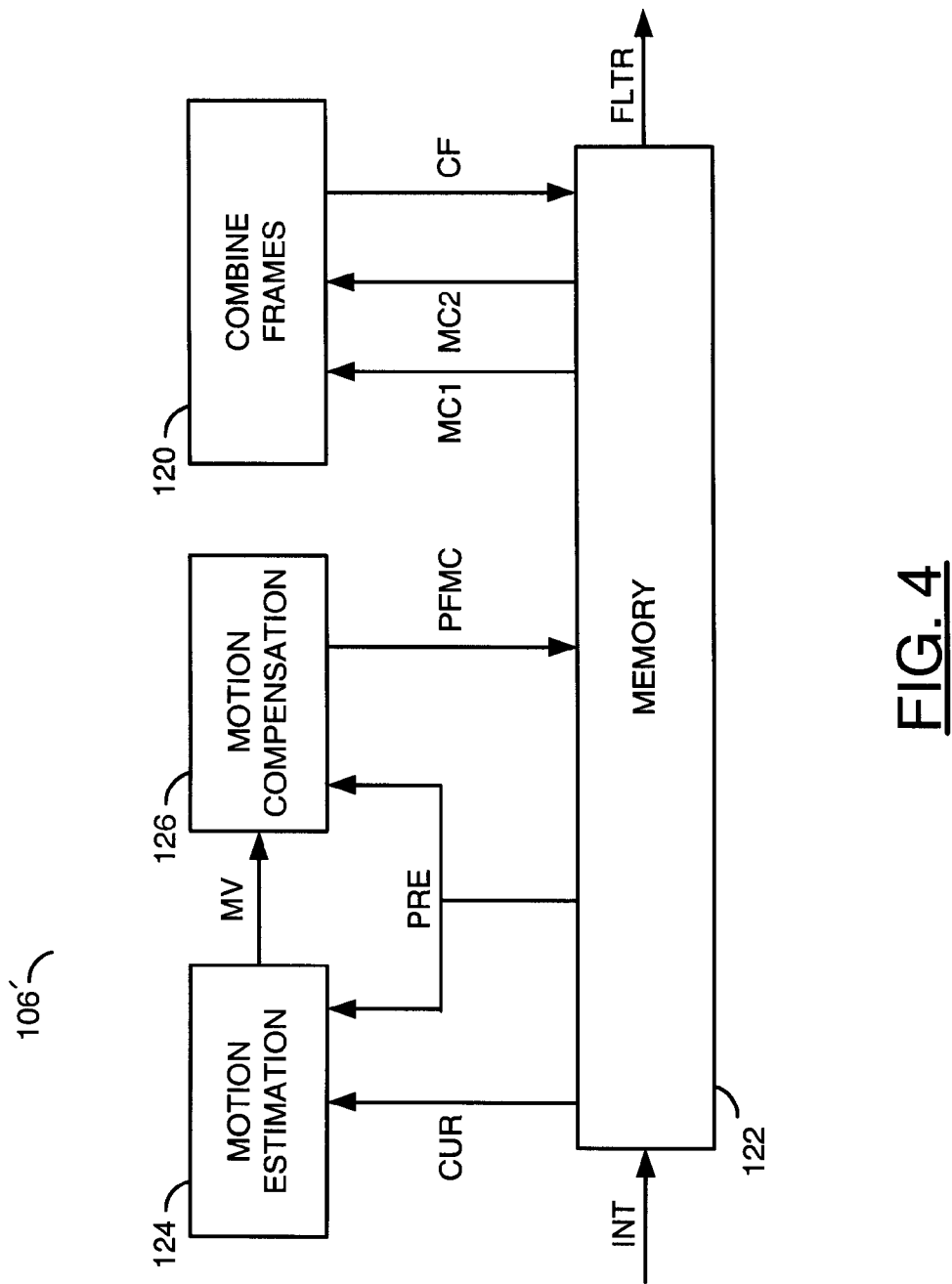
FIG. 4 is a block diagram of a second example implementation of the filter circuit.

Referring to FIG. 4, a block diagram of a second example implementation of the circuit 106 (referred to as circuit 106') is shown. The circuit 106' generally comprises the circuit (or module) 120, the circuit (or module) 122, the circuit (or module) 124 and the circuit (or module) 126.

The signal INT may be received by (written into) the circuit 122. The signal FLTR may be presented by the circuit 122. The signal CUR may be read from the circuit 122 to the circuit 124. The signal PRE may be read from the circuit 122 to both the circuit 124 and the circuit 126. The signal MV may be presented from the circuit 124 to the circuit 126. The signal PFMC may be generated by the circuit 126 and presented to the circuit 122. A first motion compensated signal (e.g., MC1) may be presented from the circuit 122 to the circuit 120. A second motion compensated signal (e.g., MC2) may also be presented from the circuit 122 to the circuit 120. The signal CF may be generated by the circuit 120 and presented back to the circuit 122.

Figure 5:
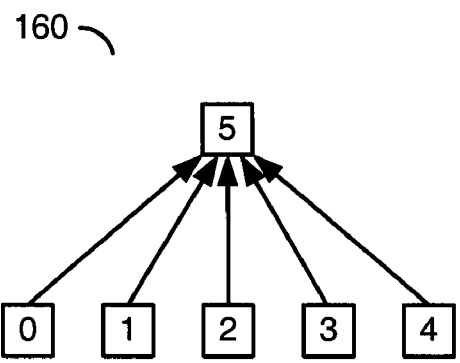
FIG. 5 is a diagram of a first example sequence of frames being combined.

Referring to FIG. 5, a diagram of an example sequence of frames 160 being combined is shown. The sequence 160 may implement the second method of the anti-shake/anti-blur method (or technique). The sequence 160 generally comprises multiple (e.g., 5) frames received by the circuit 106' to be combined into a single final frame. The second method generally motion compensates the frames of the sequence 160 referencing a center frame of the sequence 160. The circuit 106' may implement the second method.

Each of the frames (e.g., labeled 0 through 4) of the sequence 160 may be stored into the circuit 122 in order starting with frame 0 and ending with frame 4. Since a temporal position of the final frame (e.g., frame 5) may match the temporal position of the middle frame in the sequence (e.g., frame 2), no processing may be performed on the earlier frames (e.g., frame 0 and frame 1) until the middle frame 2 has been stored in the circuit 122. Thereafter, the middle frame 2 may be presented to the circuit 124 as a reference frame (or picture) in the signal CUR.

The circuit 124 may begin performing motion estimations on the earlier frames 0 and 1 once the middle frame 2 is available as the reference. The signal PRE may transfer the earlier frames 0 and 1 to the circuit 126, one frame at a time. The motion vectors resulting from the motion estimation may be presented to the circuit 126 via the signal MV. The circuit 126 may motion compensate the respective earlier frames 0 and 1, one at a time, to create motion compensated frames. The motion compensated frames may be returned to the circuit 122 in the signal PFMC. While the circuits 124 and 126 are busy with the earlier frames, the later frames (e.g., frame 3 and frame 4) may be stored in the circuit 122. The circuits 124 and 126 may continue to perform the motion estimations and motion compensations on all of the frames in the sequence 160, except for the middle frame 2 (which is not motion compensated).

With the middle frame 2 and at least one motion compensated frame available in the circuit 122, the circuit 120 may begin combining the frames. For example, the middle frame 2 and the first motion compensated frame (e.g., created from frame 1) may be transferred from the circuit 122 to the circuit 120 in the signals MC1 and MC2. The combining may begin to operate simultaneously (in parallel) with the ongoing motion estimation/motion compensation. The circuit 120 may combine the two frames and return a compensated filtered frame to the circuit 122 in the signal CF. The circuit 120 may then combine the filtered frame with the next motion compensated frame (e.g., the motion compensated version of frame 1) to update the filtered frame. The combination process may be repeated until all of the frames have been combined to create the final frame 5. The final frame 5 may then be presented in the signal FLTR.

Figure 6:
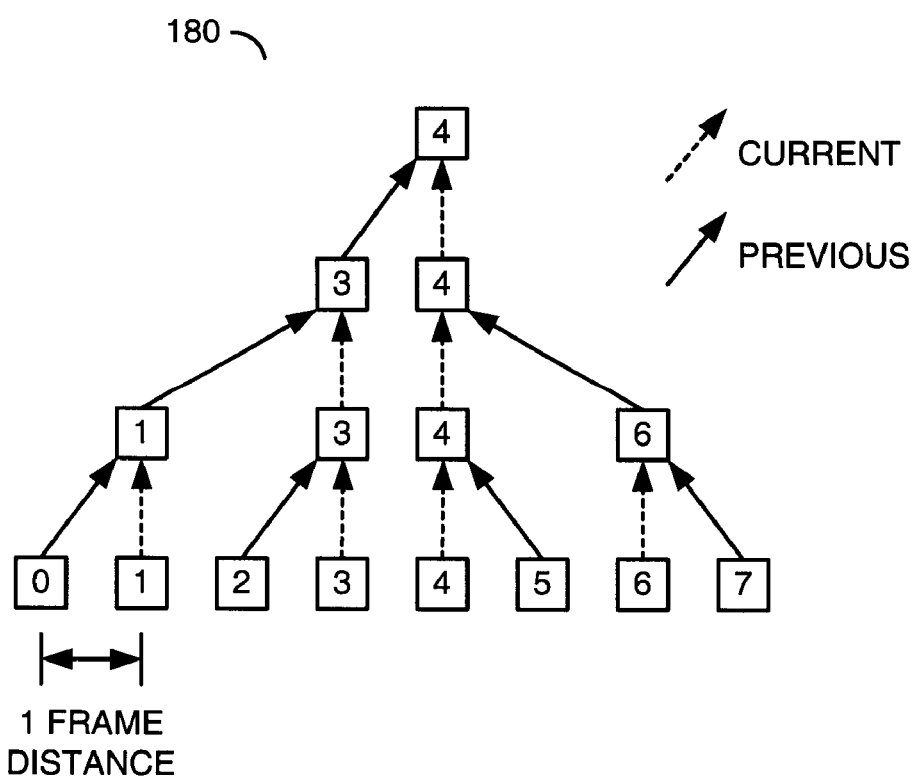
FIG. 6 is a diagram of a second example sequence of frames being combined.

Referring to FIG. 6, a diagram of a second example sequence of frames 180 being combined is shown. The sequence 180 may implement the third method of the anti-shake/anti-blur method (or technique). The sequence 180 generally comprises multiple (e.g., 8) frames received by the circuit 106' to be combined into a single final frame. The third method may be implemented by the circuit 106'.

The signal INT may write the sequence of frames 180 (e.g., labeled 0 through 7) into the circuit 122 starting with the frame 0 and ending with the frame 7. Once at least one temporal neighboring frame pair (e.g., pairs 0 and 1, 2 and 3, 4 and 5, 6 and 7) is available in the memory 122, the circuit 124 may begin motion estimations. For each frame pair, one frame may be considered the current frame (or reference frame) and the other frame in the pair may be considered the previous frame, regardless of the actual temporal order. In order to reduce the temporal distances between frames, the frame closest to the center of the sequence 180 may be treated as the current frame in the MCTF combination. For example, frame 1 may be presented to the circuit 124 as the current reference frame in the signal CUR while the frame 0 is presented to the circuits 124 and 126 as the previous (to be compensated) frame in the signal PRE.

The circuit 124 may generate the motion information in the signal MV for use by the circuit 126. The circuit 126 may motion compensate the previous frame 0 to the temporal position of the current frame 1. The motion compensated previous frame may then be returned to the circuit 122 via the signal PFMC and stored for later use. The motion estimation and the motion compensation may continue for each frame pair until half the frames (e.g., frames 0, 2, 5 and 7) have been motion compensated per the other half of the frames (e.g., frames 1, 3, 4 and 6).

After the motion compensated frames are available in the circuit 122, the circuit 120 may begin combining within the pairs. Returning to the example, the circuit 120 may combine the current frame 1 (via the signal MC1) with the motion compensated version of the previous frame 0 (via the signal MC2). The resulting frame may be returned to the circuit 122 in the signal CF and stored for later use. The combining operation within each pair may continue until all of the pairs have been processed.

The above process may be repeated with at the next level up in the pyramid shown in FIG. 6. The sequence 180 is now generally reduced to half the original number of frames. In the example, the second level generally comprises MCTF frames 1, 3, 4 and 6. Since MCTF frame 3 is temporally closer to the center of the sequence than MCTF frame 1, the MCTF frame 3 may be considered the current frame while the MCTF frame 1 may be considered the previous frame. The MCTF operations are generally performed on the two pairs (e.g., pairs 1 and 3, 4 and 6) to generate two frames at the third level up the pyramid (e.g., frame 3 and frame 4).

Between the two remaining frames, one frame (e.g., frame 4) may be considered the current frame and the other frame (e.g., frame 3) may be considered the previous frame (or vice versa). The motion estimation and motion compensation may be performed again to generate the final frame (e.g., frame 4) at the top level of the pyramid. An advantage of the pyramid method is that the frame pairs are generally temporally close to each other at all levels of the pyramid. As such, the motion compensation applied to any given frame may be small. In the above example of 8 frames, the temporal distances are generally 1 frame maximum temporal separation (8 frames to 4 frames), 2 frames maximum temporal separations (4 frames to 2 frames) and 1 frame maximum temporal separation (2 frames to 1 frame). Other numbers of starting frames may be used to meet the criteria of a particular application.

The above methods and architectures may result in a lower cost solution than existing mechanical anti-shake techniques. The cost savings may be realized by the lack of mechanical components used to reduce the shake. Compared to existing digital anti-shake/anti-blur techniques based on an increased ISO number, the present invention may produce a lower noise output by combining several high noise frames into one low-noise output frame.

The functions performed by the diagrams of FIGS. 1-6 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, magneto-optical disks, ROMs, RAMs, EPROMs, EEPROMs, Flash memory, magnetic or optical cards, or any type of media suitable for storing electronic instructions. As used herein, the term "simultaneously" is meant to describe events that share some common time period but the term is not meant to be limited to events that begin at the same point in time, end at the same point in time, or have the same duration.

While the invention has been particularly shown and described with reference to the preferred embodiments thereof, it will be understood by those skilled in the art that various changes in form and details may be made without departing from the spirit and scope of the invention.

The invention claimed is:

1. A device comprising:
   a sensor configured to generate a plurality of initial frames in response to an optical signal; and
   a filter circuit configured to (i) generate a filtered frame by combining at least a first of said initial frames and a second of said initial frames using a noise reduction technique and (ii) generate a still frame after said filtered frame has been generated by combining a third of said initial frames with said filtered frame using said noise reduction technique, wherein said filter circuit is further configured to motion compensate said initial frames referenced to a center frame of said initial frames such that said still frame is temporally aligned with said center frame.

2. The device according to claim 1, wherein said filter circuit comprises a motion compensation circuit configured to motion compensate said first initial frame before combining with said second initial frame.

3. The device according to claim 2, wherein each of said initial frames comprises a plurality of blocks and said motion compensation circuit is further configured to independently motion compensate each of said blocks.

4. The device according to claim 2, wherein said filter circuit further comprises a combine circuit configured to generate said filtered frame by spatially combining said first initial frame with said second initial frame after said first initial frame has been motion compensated.

5. The device according to claim 2, wherein said filter circuit further comprises a motion estimation circuit configured to generate a plurality of motion vectors corresponding to said first initial frame using said second initial frame as a reference.

6. The device according to claim 5, wherein said first initial frame is generated temporally before said second initial frame.

7. The device according to claim 5, wherein said first initial frame is generated temporally after said second initial frame.

8. The device according to claim 1, wherein said filter circuit is further configured to generate said filtered frame by combining each subsequent frame of said initial frames to an accumulation of all earlier frames of said initial frames.

9. The device according to claim 1, wherein said filter circuit is further configured to combine said initial frames in a pyramid fashion having at least three levels of combinations.

10. The device according to claim 1, wherein said filter circuit is further configured to update said filtered frame by combining said filtered frame with a fourth of said initial frames.

11. The device according to claim 1, wherein said filter circuit is further configured to generate a plurality of motion vectors by motion estimating said filtered frame using said third initial frame as a reference.

12. The device according to claim 1, wherein said filtered frame and said third initial frame are combined after said filtered frame is motion compensated.

13. The device according to claim 1, wherein said filter circuit is further configured to (i) generate a plurality of first filtered frames by motion compensating one of said initial frames in each of a plurality of first neighboring pairs of said initial frames and (ii) generate a plurality of second filtered frames by spatially combining said first frames with another of said initial frames in each of said first neighboring pairs.

14. The device according to claim 13, wherein said filter circuit is further configured to (i) generate a third filtered frame by motion compensating one of said second filtered frames in each of at least one second neighboring pair of said second filtered frames and (ii) generate a fourth filtered frame by spatially combining said third filtered frames and another of said second filtered frames in each of said second neighboring pairs.

15. The device according to claim 1, wherein said filtered frame and said second initial frame are generated in parallel.

16. The device according to claim 1, wherein said still frame and said third initial frame are generated in parallel.

17. The device according to claim 1, wherein said still frame is generated after said third initial frame has been generated.

18. The device according to claim 1, wherein at least one of said initial frames that is motion compensated is temporally greater than a frame distance from said center frame.

19. A device comprising:
   means for generating a plurality of initial frames in response to an optical signal;
   means for generating a filtered frame by combining at least a first of said initial frames and a second of said initial frames using a noise reduction technique; and
   means for generating a still frame after said filtered frame has been generated by combining a third of said initial frames with said filtered frame using said noise reduction technique, wherein said noise reduction technique is configured to motion compensate said initial frames referenced to a center frame of said initial frames such that said still frame is temporally aligned with said center frame.

* * * * *